Sept. 3, 1940.  K. W. HALL  2,213,582
AERATION OF PRODUCE
Filed Feb. 18, 1937  3 Sheets-Sheet 1
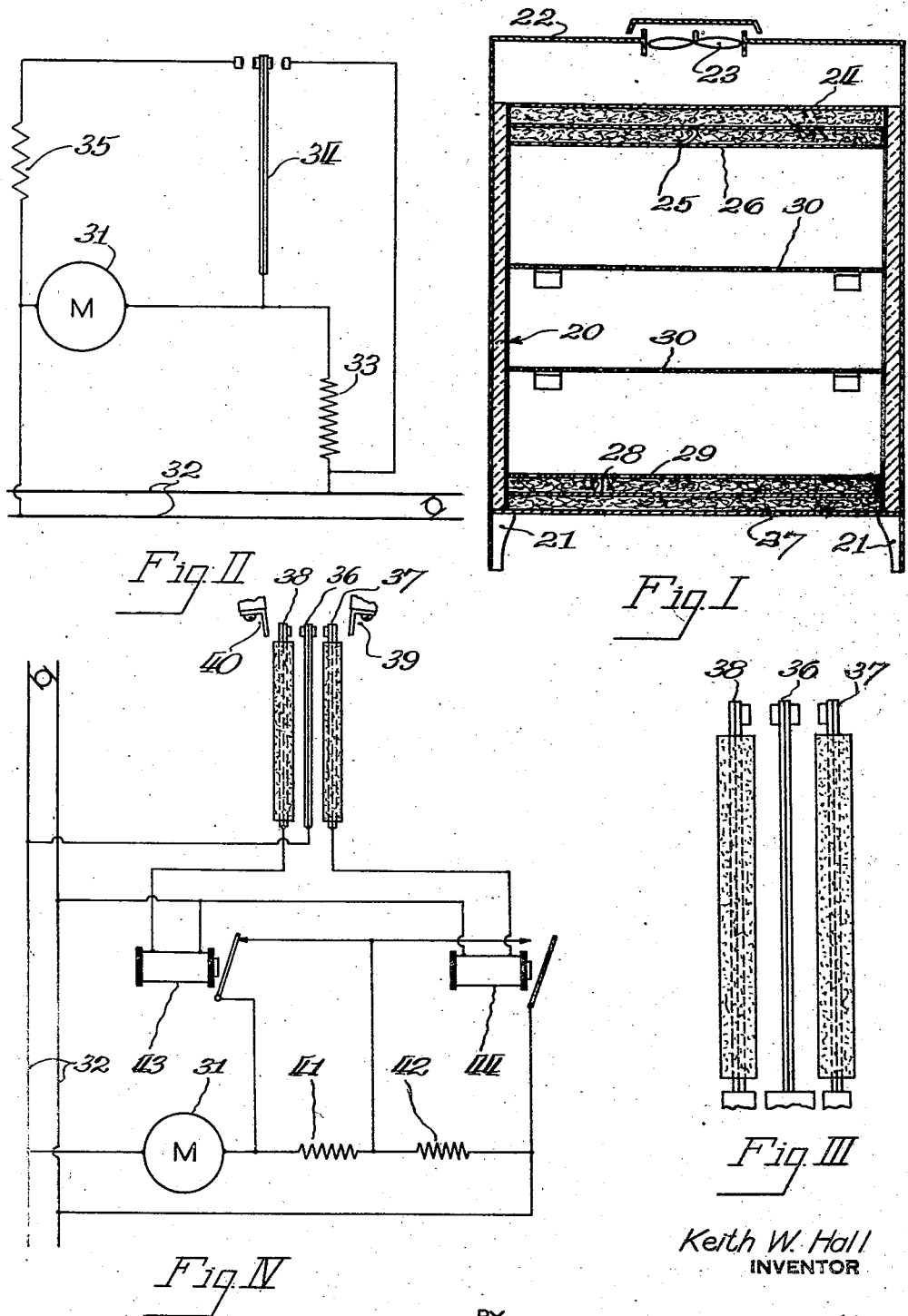
Keith W. Hall
INVENTOR
BY Williams, Bradbury, McCaleb & Hinkle
ATTORNEYS.

Sept. 3, 1940.   K. W. HALL   2,213,582
AERATION OF PRODUCE
Filed Feb. 18, 1937   3 Sheets-Sheet 2
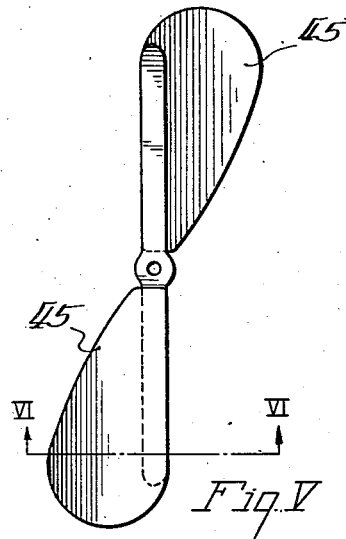
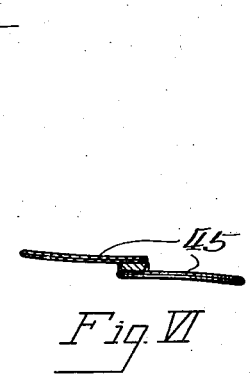
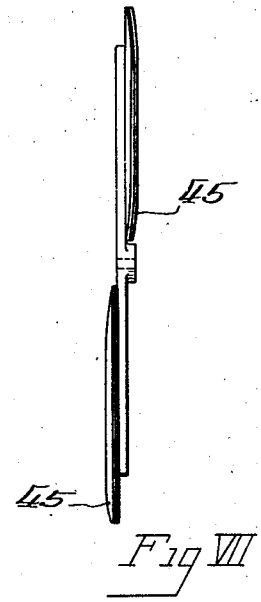
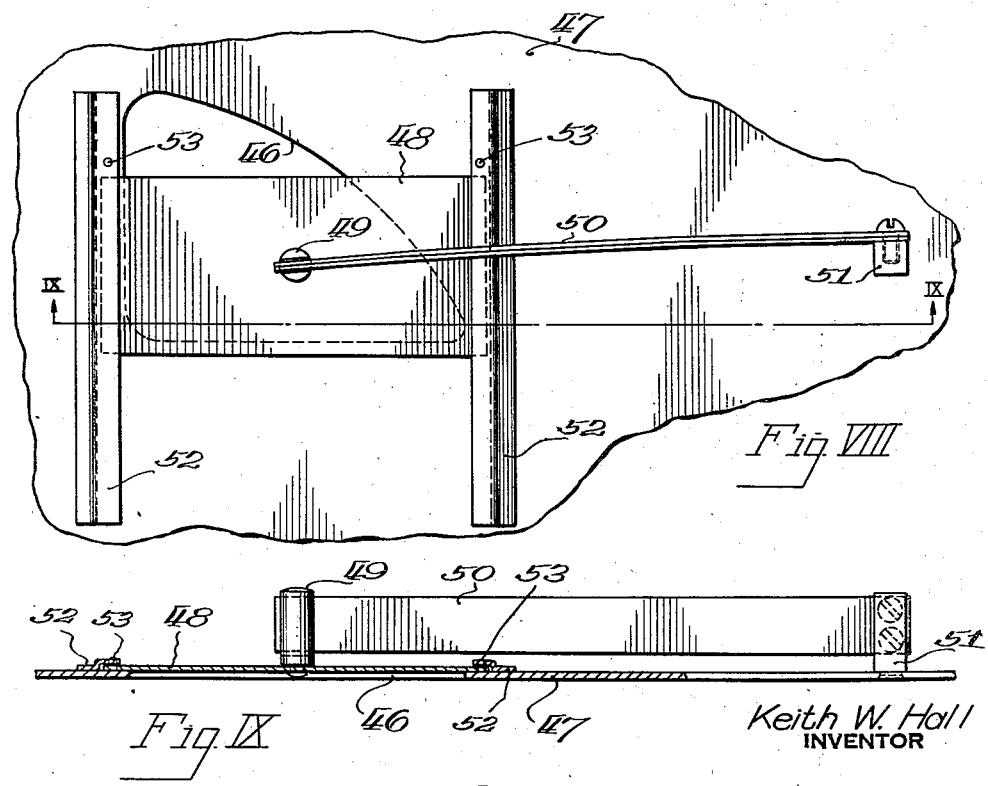

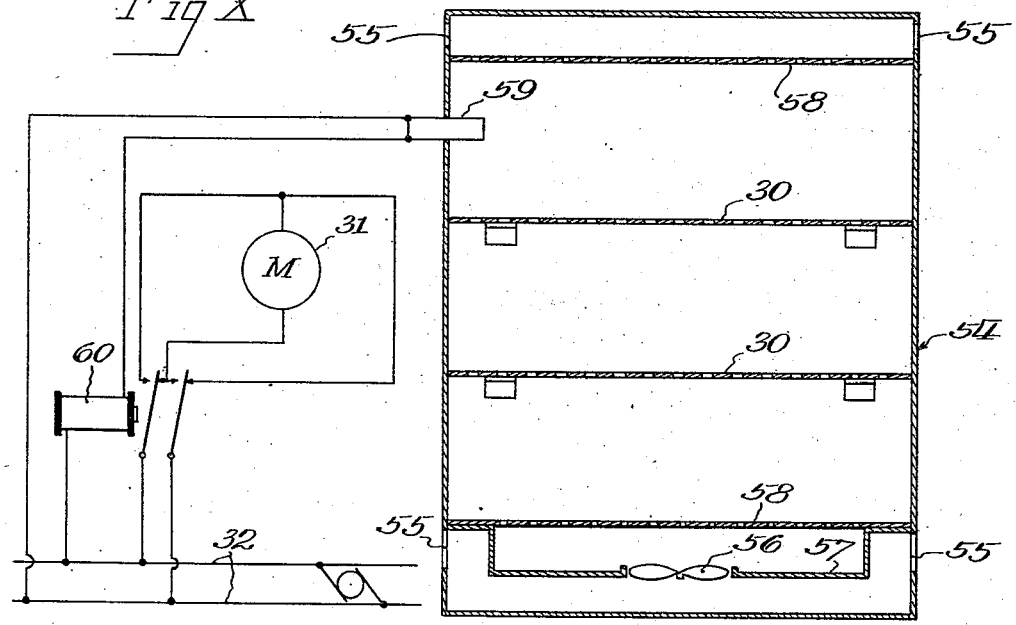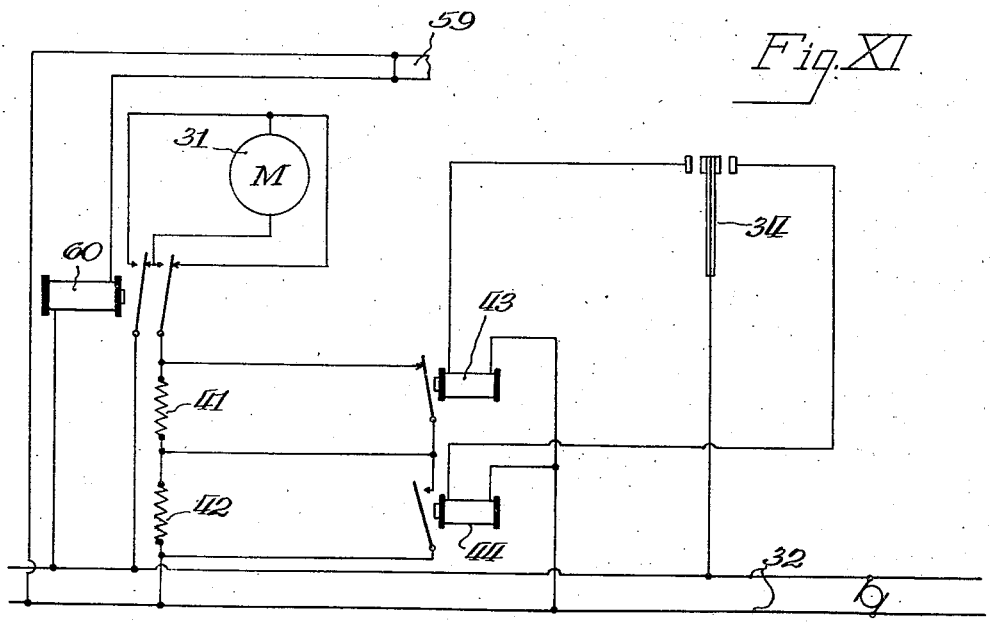

Patented Sept. 3, 1940

2,213,582

UNITED STATES PATENT OFFICE 2,213,582

AERATION OF PRODUCE

Keith W. Hall, Toledo, Ohio, assignor to Toledo Scale Company, Toledo, Ohio, a corporation of New Jersey Application February 18, 1937, Serial No. 126,513

4 Claims. (Cl. 98—52)

The invention relates to a system of aerating products of the soil, such as vegetables and fruits, which is an improvement upon the invention of John McLean Thompson disclosed in United States Letters Patent No. 1,578,218. Systems embodying the present improvement are inexpensive, yet highly effective for keeping produce in good condition, and make substantial savings possible for packers, shippers, warehousemen, and retailers of produce.

Because of the lack of a system for keeping produce in a healthy and marketable condition, retailers have heretofore been compelled to throw out unsold produce after as little as two days on their shelves. There is a spoilage loss of twenty-five to seventy-five per cent in every lot of produce merchandised in the United States, and the total annual spoilage loss in this country amounts to about fifty million dollars.

Retailers must now supply themselves with a surplus of produce above their needs, because the consequence of understocking is immediate and permanent loss of trade. If they could keep each lot of produce in marketable condition for only a few days longer than at present, they would be able to sell each day's surplus on succeeding days, so that their losses would be substantially reduced. Local retailers are also deterred from introducing unfamiliar types of vegetables and fruit to their customers by fear of prohibitive spoilage losses during the initial period in which sales are slow.

It is, of course, the consumer that has suffered most from the prevailing inability to preserve produce satisfactorily. He has been confronted with the alternative of paying exorbitant prices, or going without most kinds of desirable tree-ripened produce, during all but the short periods of the year when the various products are in season. In addition, he has had to pay prices for canned produce that have been higher than they would need to be if a suitable preservation system were available.

The prices of these canned goods must be high enough to cover the cost of maintaining a cannery having the enormous capacity required for the canning of the bulk of each crop during a period of a few weeks, and to cover the cost of storing the resulting accumulation of canned goods until it has been used up. This large canning capacity, which remains idle for all of the year except a few weeks, and the excessive storage capacity now employed can both be cut down by extension of the period in which each crop may be canned, effected by the adoption of a proper system of preservation.

The system described in Patent No. 1,578,218 is adapted to maintain the vitality and salable appearance of produce, and to prolong its life by reducing respiration, and the consumption of carbohydrates incident thereto, to the lowest rate compatible with the health of the plant. Methods employing refrigeration to low temperatures, on the other hand, either kill produce or reduce its vitality to such a degree that decay proceeds rapidly when it is removed from storage. In an attempt to avoid deterioration, marketers of fruit have adopted the practice of shipping immature products that have been "treated" to give them an appearance of maturity.

Treatment of fruit with ethylene, like refrigeration to freezing temperatures, kills the fruit as well as the fungi, and destroys its vitamins. When fruit is kept in a living, healthy condition during storage, it is just as capable of resisting diseases as it was while still on the tree, for fruit on the tree is substantially cut off from the sap supply during the final stage of ripening. It is only necessary for the fruit to be kept at moderate temperatures, in air of suitable humidity that is renewed at a rate just sufficient to keep the carbon dioxide concentration down to about 0.1%.

The produce is thus kept in a healthy condition, with no abnormal respiration, such as greater or less air flow would cause. The spread of rot from bruises is cut down, and the building up of protective scar tissue by drying out of injured plant cells is permitted to proceed, the spread of decay being thereby further inhibited. The patent referred to discloses a method of passing air through stored produce that is quite satisfactory for moderate quantities of produce, when the relative humidity and temperature are kept within the range specified in the patent. However, the problem of securing proper distribution of the air flow is increasingly difficult with large storage chambers, holding great quantities of produce.

In order that highly uniform distribution of the air may be secured, it is preferably introduced through equal sections of the floor of the compartment at an approximately equal rate, and withdrawn through the top wall of the compartment in a similar manner. When the air passing through the compartment is thus uniformly distributed, control of temperature and relative humidity may be dispensed with, and the entering air may merely be withdrawn slowly and continuously from the outer atmosphere.

Limitation of respiration by restriction of the air supply to the produce makes the relative humidity of the air relatively unimportant; for depletion of the free moisture content of the produce can be remedied by reabsorption of water from the air, although water generated by oxidation of carbohydrates and dissipated during respiration cannot be replaced. Since the maintenance of health and vitality prevents the breakdown of the cellulose membranes surrounding the fluid-containing cells of the plants and the consequent rapid diffusion of the fluids to the surface, and since the restriction of respiration cuts down the heat generation that accelerates evaporation, keeping produce in a healthy state of dormancy retards the mechanical processes leading to loss of water as well as the chemical processes leading to its generation.

Uniform distribution of the air passing slowly through the compartment causes a considerable lag of the temperature variations in the compartment behind the temperature variations of the outer atmosphere. Thus the variations of the temperature of the produce are more gradual and more limited in range than the variations outside. When a lag of about twenty-four hours is attained, the situation is ideal, because an unusually low or high temperature of the incoming air on any one day cannot have much effect on the produce before being counterbalanced by the more normal temperature of the atmosphere on the succeeding day.

The inducement of dormancy by restriction of air flow causes the produce to respond more and more slowly to temperature changes, so that it is capable of withstanding changes rapid enough to be injurious to produce not in a dormant state. In addition, healthy fruits and vegetables are to some extent able to regulate their own temperature, like animals. Uniform, slow aeration of a compartment can be used to keep its temperature as low on hot days as it could be kept by ventilation with a much greater air flow, because ventilation involves the production of localized rapid air currents which increase conduction through the compartment walls. These air currents also cause excessive respiration of the produce which they contact.

Although a thermally insulating film of still air may exist along the inner surfaces of the compartment walls when the air flow is very uniform, it is preferable for the walls of the storage compartment to be provided with insulation. A heat reflecting outer surface, such as that obtained by painting the exterior of the compartment a light color, is of still more importance than insulation when the compartment is subject to intense heat radiation from the sun or other sources.

The present invention is based on the discovery that when a slow stream of air is withdrawn from the atmosphere without any treatment thereof and passed through a produce storage compartment, remarkably uniform conditions of temperature and relative humidity can be maintained in the compartment by regulation of the rate of air flow such that the rate of flow varies directly with the temperature of the outer atmosphere. Thus, injury to the produce may be prevented by mere control of the air flow in accordance with outside temperature. The principal object of the invention is to provide aeration for products of the soil that is carried out and controlled in such a manner that they are protected against unfavorable atmospheric conditions and maintained in a living and a healthy condition. More specific objects and advantages are apparent from the description in which reference is had to the accompanying drawings illustrating preferred apparatus for carrying out the invention.

Fig. 1 is a diagrammatic vertical section of a small cabinet that can be employed for preservation of products of the soil in accordance with the invention;

Fig. 2 is a wiring diagram of an electrical system for automatically controlling the supply of air to a produce storage compartment in accordance with the invention;

Fig. 3 is a diagrammatic elevational view of a temperature-controlled device that can be substituted for the corresponding temperature-controlled device in the wiring diagram of Fig. 2;

Fig. 4 is a slightly modified wiring diagram;

Fig. 5 is a plan view of a fan that may be used in controlling air flow in accordance with temperature;

Fig. 6 is a section taken on the line 6—6 of Fig. 5;

Fig. 7 is an edgewise view of the fan of Fig. 5;

Fig. 8 is a plan view of a thermostatic device for regulating the size of an inlet or outlet orifice in accordance with the invention;

Fig. 9 is an elevation, partly in section, along the line 9—9 of Fig. 8;

Fig. 10 is a diagrammatic view of an apparatus showing a modified wiring diagram, and Fig. 11 is a preferred wiring diagram in which the features of Fig. 4 and Fig. 10 are combined.

These specific drawings and the specific description that follows merely disclose illustrative applications of the invention and are not to impose limitations upon the claims.

When the rate at which air is passed from the atmosphere through a produce storage compartment is regulated to maintain rates that vary directly with the temperature of the outer atmosphere, important results are achieved. The heat generated by respiration of the produce is carried away only slowly by the relatively low air flow that is maintained when the temperature of the outer atmosphere is relatively low, so that the temperature in the compartment tends to remain substantially higher than the outside temperature. When the outer temperature is relatively high, however, the heat of respiration is carried away rapidly by the greater air flow employed. Thus, the temperature of the outer atmosphere when rising tends to catch up with the compartment temperature, so that the temperature in the compartment rises more slowly than the outer temperature. It likewise falls more slowly than the outer temperature. However, the uniformity of the compartment temperature relative to the outside temperature has been found such, and the scope of the compartment temperature variations has been found so much smaller than that of the outside temperature variations, that another explanation must be sought.

When the rate of air flow is caused to vary several hundred percent as the temperature of the atmosphere changes throughout the normal range, a remarkable variation occurs in the temperature gradient between the inside and the outside of the storage compartment. The ratio of the amount of heat converted from sensible to latent heat through evaporation of moisture from the produce to the amount of heat generated by respiration of the produce increases so remarkably as the rate of air flow is raised, that the temperature of the compartment, which was several degrees higher than the outside temperature with lower rates of air flow, may fall even below the temperature of the outer atmosphere when higher rates are employed.

The preservation of a uniform temperature in the storage compartment has been found to be essential to proper preservation of the prduce and a remarkably uniform temperature can be maintained by regulation of the rate of air flow in accordance with the invention, without any direct control of temperature or relative humidity. A highly advantageous regulation of the relative humidity in the storage compartment is also effected by the carrying out of the present invention. The increased air flow that takes place whenever any rise in the outside temperature occurs, causes the temperature of the produce in the compartment to be rapidly brought up near the outside temperature so that condensation of moisture in the compartment is minimized. Any condensation that does occur upon a rise in the outside temperature is quickly dried up by the rapid air flow and the evaporation of this moisture helps to prevent an unnecessarily rapid rise in the temperature of the produce. On the other hand, when the outside temperature falls considerably below that of the produce, the reduction of the air flow prevent any material dehydration of the produce from taking place.

The minimizing of condensation and the rapid evaporation of any moisture that does condense are important, because moisture on produce favors the growth of the common types of mold. In addition, a film of water plugs the microscopic breathing pores on the surface of the produce and causes suffocation just as surely as the interruption of the supply of fresh air. Breaking down of the cellulose walls surrounding the liquid-containing cells in the interior is the result, so that the produce becomes water-logged under the surface. Then it is too late for the produce to be saved by the removal of the moisture film from the outer surface. The flooded interior cells degrade and the health, as well as the flavor, of the produce is lost. The present invention is suitable for keeping produce healthy by carrying it through short periods in unheated freight cars or other unheated storage compartments in winter, or for carrying it through a day or two of freezing weather that occurs in an otherwise temperate season. When the outside temperature drops and stays down for only a brief period, it has been found that the temperature in the compartment falls hardly at all.

Ripe fruit, when ready to fall from the tree, has a low rate of respiration. Its rind prevents it from losing moisture rapidly so that it can easily be preserved in accordance with the invention for weeks or even months. Leafy vegetables or flowers, on the other hand, have reached no comparably dormant condition when they are picked and, in addition, have been mutilated in most instances by the severing of the roots. Their respiration is at a relatively high rate.

In order that abnormal respiration may be prevented, air must be passed through a storage compartment packed with oranges or similar fruit at a sufficient rate to change the atmosphere of the compartment completely about twenty times each hour when the temperature is 75 degrees F. The rapid respiration of leafy vegetables makes necessary a considerably greater average rate of air flow. The minimum rate of air flow that may be employed for a given compartment containing stored produce is easily determined if the air flow required to maintain the carbon dioxide concentration in the compartment slightly above 0.1 per cent is measured when the temperature is at the lowest point normally encountered. Rates of air flow should then be maintained that vary directly with the temperature of the outer atmosphere, and the rate of air flow employed at the highest outside temperature normally encountered should be such that it produces a temperature inside the compartment no more than slightly below that outside temperature.

Fig. 1 shows a small storage compartment by way of illustration, but it is to be understood that the invention is equally applicable to compartments of all sizes. In fact, the low ratio of wall area to storage volume in a large chamber is advantageous in that it reduces changes in temperature of the produce caused by transfer of heat through the walls. Any suitable arrangement for distributing the flow of air through the compartment may be employed, but it is recommended that the air be caused to enter the compartment through a wall of the compartment that is provided with evenly distributed perforations, and leave through a similarly perforated wall.

The insulated cabinet 20 of Fig. 1 is supported upon legs 21, and is covered by a housing 22, having an opening to the outer atmosphere in which is located at fan 23. By means of the fan 23 a pressure differential is maintained between the interior of the housing 22 and the outer atmosphere, and a partition 24 containing a few small perforations separates the storage compartment from the interior of the housing 22. The small perforations in the partition 24 throttle the stream of air that is propelled through the compartment by the fan. They greatly facilitate the regulation of the air flow, which, without the throttling action of the perforations, would vary widely with small variations in the speed of the fan.

Below the perforated partition 24 are provided two additional partitions 25 and 26 that assist in keeping the air flow uniformly distributed. The uppermost of these two partitions has more perforations than the top partition 24 and its perforations are greater in diameter. The lowermost partition 26 has perforations that are still greater in size and number and the air flows through these perforations in a large number of evenly distributed strams of very low velocity. A partition 27 at the bottom of the chamber, similar to the partition 24 that has already been described, may be used instead of or in addition to the partition 24 at the top of the chamber, and intermediate partitions 28 and 29 corresponding to the partitions 25 and 26 respectively should be provided just above the bottom partition 27. Because of the provision of the bottom partition 27 in the device of Fig. 1, the pressure of the air in the compartment will always be above or below the pressure of the atmosphere, depending on the direction of rotation of the fan 23.

The spaces between the partitions are preferably filled with a type of porous insulating material that offers little resistance to the passage of air. Although the temperature of the produce in an insulated compartment provided with slow aeration is generally somewhat above the temperature of the outer atmosphere, the outside temperature may at times rise slightly above that prevailing in the compartment. At such times it is desirable for the air to enter the compartment at the bottom for the reason that condensation is likely to occur at the point where the air enters the compartment. The provision of baffles at the bottom of the compartment is then advantageous, because moisture condenses upon the baffles instead of upon the produce in the bottom of the compartment. The temperature of the air rises after it leaves the baffles and no further condensation takes place. In the inlet were at the top of the comparament under these circumstances, the condensed moisture would drip upon the produce and cause deterioration thereof.

The baffle 27 at the bottom of the compartment is of value particularly when the air in the compartment is colder than the outer atmosphere, because the baffle 27 then prevents the air inside the compartment from falling rapidly out at the bottom to make room for warmer air from the outer atmosphere. Similarly, the partition 24 at the top of the compartment, by throttling the stream of air at that point, permits accurate control of the air flow when the inside temperature is higher than the outside temperature by preventing the inside air from pouring out of the top of the compartment. Shelves 30 that are provided in the compartment of Fig. 1 for supporting the produce are perforated so that they do not interfere with the vertical flow of the air.

Fig. 1 shows a preferred construction for a storage cabinet, but the invention is applicable to any produce storage compartment. Any preferred method may be used for withdrawing a slow stream of air from the outer atmosphere and passing it through the compartment.

Fig. 2 shows a simple, illustrative arrangement for regulating the air flow to maintain rates of flow that vary directly with the temperature of the outer atmosphere. An electric motor 31 for driving a fan or other air propelling device may be supplied with current from line wires 32. A resistance 33 may be inserted in series with the motor and connected in such a manner with a thermostat 34 that it is short-circuited by the thermostat whenever the temperature of the outer atmosphere is above a certain value. A second resistance 35 may be arranged to be connected in parallel with the motor 31 by the thermostat 34 whenever the temperature of the atmosphere is below a certain value. By means of the simple arrangement shown in Fig. 2 the power supplied to the motor 31 is varied in three stages according to the outside temperature.

It has been found highly advantageous to regulate the flow of air in accordance with the rapidity of atmospheric temperature changes, as well as in accordance with the actual values of atmospheric temperature. When the outside temperature rises rapidly there is especial danger of condensation in the compartment and the flow of air through the compartment should be increased as rapidly as possible. Increasing the rate of air flow as soon as a rapid rise of the outside temperature begins causes the temperature in the compartment to be brought down to or slightly below the outside temperature so that the produce is to a considerable extent spared the shock of the rapid temperature change. Persistence of condensed moisture in the compartment is also prevented.

On the other hand, the rate of air flow should be reduced immediately when a rapid decline of the outside temperature begins, so that the differential between the inside and outside temperature may be increased, the heat of respiration conserved and the produce spared the shock of a rapid drop in temperature. Thus, an arrangement is preferably provided such that the air flow is increased when the outside temperature rises at more than a predetermined rate and is decreased when the outside temperature falls at more than a predetermined rate.

The preferred device for effecting a control in accordance with the rate of change of temperature comprises a pair of thermostatic elements arranged to move in the same direction as the temperature changes, one of which is thermally insulated to retard its response to temperature changes. The controlling device may then be actuated by relative movement of the two thermostatic elements occurring when the temperature changes rapidly enough so that the movement of the uninsulated element lags the necessary amount behind the movement of the insulated element.

Fig. 3 shows a temperature-controlled device that may be substituted for the thermostat 34 in the wiring diagram of Fig. 2. Three thermostatic elements are arranged adjacent and parallel to one another and the two outermost elements are provided with insulation while the central element 36 is not. It is assumed that the elements deflect toward the right as the temperature rises, and toward the left as the temperature falls. When the temperature changes gradually no electrical contact is made, but when a rapid rise in temperature occurs, the central element 36 makes contact with the right-hand element 37. A rapid drop in temperature causes the central thermostatic element 36 to contact the left-hand element 38. In Fig. 4, fixed stops 39 and 40 are shown just beyond the outermost elements 37 and 38, respectively. They allow only a limited movement of the outermost thermostatic elements 37 and 38 so that no matter how gradual the change in temperature may be, the two left-hand elements make contact whenever the temperature is above a certain value and the two right-hand elements make contact whenever the temperature falls below a certain value.

In the wiring diagram of Fig. 4, two resistances 41 and 42 are connected in series with the fan motor 31. When the central thermostatic element 36 is not in contact with either of the outer elements 37 and 38, the resistance 42 is connected in series with the motor while the resistance 41 is short-circuited by the normally closed contacts of the relay 43. When the thermostatic elements 36 and 38 make contact, the relay 43 is energized and causes its contacts to open so that the resistance 41 is also placed in series with the fan motor 31. When the central element 36 makes contact with the right-hand element 37, however, the corresponding relay 44 is energized to close its normally open contacts so that both of the resistances 41 and 42 are short-circuited. The advantages attained by the use of relays in the system of Fig. 4 are obvious. This system, like the system of Fig. 2, provides three speeds for the fan motor.

The specific controls for air flow that have been discussed provide regulation of the power supplied to the air propelling device. When an air propelling device such as a fan is used, however, any means of regulating the air propelling capacity of the device may be employed. Thus, a bladed fan that is used to propel the air may be provided with an arrangement for thermostatically regulating the pitch of the fan blades in accordance with the temperature. The blades may be connected with the hub of the fan by strips of thermosatic metal that twist to vary the pitch of the blades as the temperature changes, or the blades themselves may be of thermostatic metal like the blades 45 of the fan shown in Figs. 5, 6 and 7.

On the other hand, regulation of the air propelling device may be dispensed with entirely and a thermostatic device may be provided for regulating the size of an orifice through which the air flows. Fig. 8 shows an orifice 46 in a plate 47, the size of which is regulated by a sliding damper 48. Pivoted in the damper is a pin 49 having a notch through which extends the outer end of a thermostatic strip 50. The strip is secured to a standard 51 fixed to the plate 47 and it moves the sliding damper 48 to vary the rate of air flow directly with the temperature of the outer atmosphere. A pair of guides 52 is provided for the edges of the sliding damper 48 and pins 53 prevent the orifice 46 from being restricted to less than a certain minimum size. The shape of the orifice 46 can be made such that the rate of air flow is exactly the proper amount at each temperature that the outer atmosphere may reach. The orifice 46 may be triangular, rectangular, or any other shape required to give the desired variation of air flow in accordance with temperature.

The fact that the air is preferably taken in at the bottom of the compartment when the inside temperature is below the outside temperature has been mentioned. It has also been found, strangely enough, that better results are obtained when the inside temperature is above the outside temperature by introducing the air at the top of the compartment and exhausting it at the bottom. It would be expected that under such conditions convection currents would cause an uneven distribution of the air flow, but at the slow rates of flow in question the air has been found to circulate very uniformly throughout the compartment when it is taken in at the top and exhausted at the bottom, even though the inside temperature is above that of the outer atmosphere. This method of passing the air through the compartment also provides greater uniformity of temperature and relative humidity therein. The temperature is lowest at the top and bottom, but is more uniform throughout the compartment than the temperature that prevails when the air is taken in at the bottom and exhausted at the top. This lack of uniformity is due to the fact that the air begins to rise in temperature as soon as it enters the compartment at the bottom. The hottest air rises to the top of the compartment and the temperature in the upper portion of the compartment is considerably higher than the temperature in the lower portion.

In accordance with the invention the air is preferably caused to enter at the bottom and leave at the top of the compartment when the temperature at a point inside the compartment is below the outside temperature, and is caused to enter at the top and leave at the bottom when the temperature at that point is above the outside temperature.

Figs. 10 and 11 show a system that provides such regulation. The cabinet 54 is provided with ports 55 that serve either as outlets or as inlets. A fan 56 is arranged in conjunction with a casing 57 for propelling air through the chamber, and perforated partitions 58 are provided at the bottom and top of the compartment to distribute the stream of air. Shown diagrammatically in Fig. 10 is a differential thermostat 59 that closes a circuit through the coil of a relay 60 whenever the temperature inside the compartment is below that of the outer atmosphere, and opens the circuit through the relay coil whenever the temperature inside the compartment is above that of the outer atmosphere. Normally the double pole, double throw contacts of the relay 60 cause the current to flow through the motor 31 of the fan in such a direction that the fan propels the air downward through the compartment, the temperature in the compartment being above that of the outer atmosphere. When a temperature lower than the outside temperature prevails in the compartment, the energization of the relay causes the direction of the current through the motor to be reversed so that the fan is reversed and the air is propelled upward through the compartment.

Fig. 11 shows a combination of the systems illustrated in the other wiring diagrams. The differential thermostat 59 causes the direction of the fan to be reversed in the same manner as in the system of Fig. 10. At the same time, rates of air flow are maintained that vary directly in accordance with the outside temperature, the thermostatic element 34 functioning in the same manner as the thermostatic element 36 of Fig. 4. Although the thermostatic element shown in Fig. 4 is responsive to temperature alone and not to rate of change in temperature, it may be replaced by a temperature responsive device exactly like that shown in Fig. 4.

The embodiments of the invention that have been disclosed may be modified and various other systems embodying the substance of the invention may be devised to meet various requirements.

I claim:

1. In an apparatus of the class described, in combination, a compartment for storage of produce, means for withdrawing a slow stream of air from the outer atmosphere for passage through the compartment to permeate the produce, temperature responsive means having a thermosensitive element exposed to the outer atmosphere, and flow-regulating means controlled by the temperature-responsive means to maintain the air flow at rates that vary directly with the temperature of the outer atmosphere.

2. In an apparatus of the class described, in combination, a thermally insulated compartment for storage of produce, means for withdrawing a slow stream of air from the outer atmosphere for passage through the compartment, and temperature-controlled means for regulating the air flow to cause the air to enter at the bottom and leave at the top of the compartment when the temperature at a point inside the compartment is below the outside temperature, and to enter at the top and leave at the bottom when the temperature at said point is above the outside temperature.

3. In an apparatus of the class described, in combination, a compartment for storage of produce, means for withdrawing a slow stream of air from the outer atmosphere for passage through the compartment, temperature-controlled means having a thermosensitive element exposed to the outer atmosphere for regulating the air flow to cause the air to enter at the bottom and leave at the top of the compartment when the temperature at a point inside the compartment is below the outside temperature, and to enter at the top and leave at the bottom when the temperature at said point is above the outside temperature, and flow-regulating means controlled by said thermosensitive element to maintain the air flow at rates that vary directly with the temperature of the outer atmosphere.

4. A method of aerating products of the soil in a storage compartment that comprises withdrawing a slow stream of air from the outer atmosphere, passing it through the compartment, and regulating the air flow to cause the air to enter at the bottom and leave at the top of the compartment when the temperature at a point inside the compartment is below the outside temperature, and to enter at the top and leave at the bottom when the temperature at said point is above the outside temperature.

KEITH W. HALL.